United States Patent
Zhang et al.

(10) Patent No.: US 11,893,685 B2
(45) Date of Patent: Feb. 6, 2024

(54) LANDFORM MAP BUILDING METHOD AND APPARATUS, ELECTRONIC DEVICE AND READABLE STORAGE MEDIUM

(71) Applicant: BEIJING BAIDU NETCOM SCIENCE TECHNOLOGY CO., LTD., Beijing (CN)

(72) Inventors: Junjun Zhang, Beijing (CN); Yi Zeng, Beijing (CN); Xiaopei Hou, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 155 days.

(21) Appl. No.: 17/755,172

(22) PCT Filed: Nov. 17, 2021

(86) PCT No.: PCT/CN2021/131179
§ 371 (c)(1),
(2) Date: Apr. 22, 2022

(87) PCT Pub. No.: WO2022/267311
PCT Pub. Date: Dec. 29, 2022

(65) Prior Publication Data
US 2023/0222733 A1 Jul. 13, 2023

(30) Foreign Application Priority Data
Jun. 22, 2021 (CN) .......................... 202110694174.2

(51) Int. Cl.
*G06T 17/05* (2011.01)
*G06V 10/764* (2022.01)
(Continued)

(52) U.S. Cl.
CPC ............... *G06T 17/05* (2013.01); *G06T 3/40* (2013.01); *G06T 5/50* (2013.01); *G06V 10/46* (2022.01);
(Continued)

(58) Field of Classification Search
None
See application file for complete search history.

(56) References Cited

U.S. PATENT DOCUMENTS

| 8,774,470 B1 * | 7/2014 | Schmidt | G06T 7/11 |
| | | | 382/113 |
| 2019/0122336 A1 * | 4/2019 | Mercer | G06T 3/40 |

(Continued)

FOREIGN PATENT DOCUMENTS

| CN | 1804863 A | 7/2006 |
| CN | 100392668 C | 6/2008 |

(Continued)

OTHER PUBLICATIONS

Darwish, A., K. Leukert, and W. Reinhardt. "Urban land-cover classification: an object based perspective." 2003 2nd GRSS/ISPRS Joint Workshop on Remote Sensing and Data Fusion over Urban Areas. IEEE, 2003.*

(Continued)

*Primary Examiner* — Ryan M Gray
(74) *Attorney, Agent, or Firm* — Kwan & Olynick LLP (57) ABSTRACT

The present disclosure provides a landform map building method and apparatus, an electronic device and a readable storage medium, and relates to the field of image processing technologies. The method for building landform map includes: acquiring a to-be-processed image to obtain a grayscale image of the to-be-processed image; classifying pixels in the grayscale image according to grayscale values to obtain binary images corresponding to different landform (Continued)

categories; extracting image spot contours of image spots in the binary images, and taking the extracted image spot contours as vector graphs to obtain a vector graph set; merging, according to position information, the vector graphs corresponding to a same landform category in the vector graph set, and obtaining a first landform map according to merging results corresponding to different landform categories; and mapping, by using a preset landform type, the vector graphs corresponding to different landform categories in the first landform map, and taking a mapping result as a second landform map.

20 Claims, 4 Drawing Sheets

(51) Int. Cl.
    *G06V 10/46*     (2022.01)
    *G06T 3/40*     (2006.01)
    *G06T 5/50*     (2006.01)

(52) U.S. Cl.
    CPC .. *G06V 10/764* (2022.01); *G06T 2207/20221* (2013.01)

(56) References Cited

U.S. PATENT DOCUMENTS

| | | | |
|---|---|---|---|
| 2020/0072610 | A1 | 3/2020 | Hofmann et al. |
| 2020/0327673 | A1* | 10/2020 | Tong ............ G06T 7/194 |
| 2021/0342586 | A1* | 11/2021 | Fleisig ............ G06V 20/182 |

FOREIGN PATENT DOCUMENTS

| | | | |
|---|---|---|---|
| CN | 104361616 | A | 2/2015 |
| CN | 106384081 | A | 2/2017 |
| CN | 104361616 | B | 9/2017 |
| CN | 107292339 | A | 10/2017 |
| CN | 107766825 | A | 3/2018 |
| CN | 107861129 | A | 3/2018 |
| CN | 109100719 | A | 12/2018 |
| CN | 110766038 | A | 2/2020 |
| CN | 106384081 | B | 4/2020 |
| CN | 111967341 | A | 11/2020 |
| CN | 112651896 | A | 4/2021 |
| CN | 112733745 | A | 4/2021 |
| CN | 112785686 | A | 5/2021 |
| CN | 112991536 | A | 6/2021 |
| CN | 113409461 | A | 9/2021 |

OTHER PUBLICATIONS

Mukhopadhyay, Susanta, and Bhabatosh Chanda. "Multiscale morphological segmentation of gray-scale images." IEEE transactions on Image Processing 12.5 (2003): 533-549.*
Sutton, Tim, Otto Dassau, and Marcelle Sutton. "A gentle introduction to GIS." (2009).*
Zhu, Hongchun, et al. "Landform classification based on optimal texture feature extraction from DEM data in Shandong Hilly Area, China." Frontiers of Earth Science 13 (2019): 641-655.*
Chen Yan, et al., Extracting and Analyzing TUPU-Cell Based on Remote Sensing Image Processing, Apr. 30, 2006, 10 pgs.
Cheng Zhongling, et al., An Experiment of 1-1 Million Digital Geomorphic Mapping Methods—A Case Study Of Kunming Map (G-48), Jul. 20, 2007, 11 pgs.
Notice of allowance for CN2021106941742, dated May 18, 2023, 6 pgs.
Pan Banglong, Research on Digital Remote Sensing Geomorphic Mapping Method of Auxiliary Terrain Form Model, Dec. 31, 2015, 4 pgs.
Zhang Dongmei, et al., Development of Landform Shading in the Atlas of Anhui Province, Apr. 25, 2013, 4 pgs.
Chinese International Search Report dated Jan. 28, 2022 for PCT Application No. PCT/CN2021/131179, 4 Pages.

* cited by examiner

LANDFORM MAP BUILDING METHOD AND APPARATUS, ELECTRONIC DEVICE AND READABLE STORAGE MEDIUM

This application is a national application and, pursuant to 35 U.S.C. § 371 is entitled to and claims the right of priority based on PCT application no. PCT/CN2021/131179, filed on Nov. 17, 2021, which claims priority to Chinese Patent Application No. 202110694174.2, entitled "LANDFORM MAP BUILDING METHOD AND APPARATUS, ELECTRONIC DEVICE AND READABLE STORAGE MEDIUM" and filed with the Chinese Patent Office on Jun. 22, 2021, the entire contents of which are incorporated herein by reference.

FIELD OF THE DISCLOSURE

The present disclosure relates to the field of computer technologies, and in particular, to the field of image processing technologies. A landform map building method and apparatus, an electronic device and a readable storage medium are provided.

BACKGROUND OF THE DISCLOSURE

In current map applications, at a scale of 25 km to 1000 km, there is no expression of map information, and landform information is lacking. In the prior art, when a map including landform information is built, problems of high costs of manual mapping and low accuracy of landform features arise.

SUMMARY OF THE DISCLOSURE

According to a first aspect of the present disclosure, a method for building landform map is provided, including: acquiring a to-be-processed image to obtain a grayscale image of the to-be-processed image; classifying pixels in the grayscale image according to grayscale values to obtain binary images corresponding to different landform categories; extracting image spot contours of image spots in the binary images, and taking the extracted image spot contours as vector graphs to obtain a vector graph set; merging, according to position information, the vector graphs corresponding to a same landform category in the vector graph set, and obtaining a first landform map according to merging results corresponding to different landform categories; and mapping, by using a preset landform type, the vector graphs corresponding to different landform categories in the first landform map, and taking a mapping result as a second landform map.

According to a second aspect of the present disclosure, an apparatus for building landform map is provided, including: an acquisition unit configured to acquire a to-be-processed image to obtain a grayscale image of the to-be-processed image; a first processing unit configured to classify pixels in the grayscale image according to grayscale values to obtain binary images corresponding to different landform categories; an extraction unit configured to extract image spot contours of image spots in the binary images, and take the extracted image spot contours as vector graphs to obtain a vector graph set; a merging unit configured to merge, according to position information, the vector graphs corresponding to a same landform category in the vector graph set, and obtain a first landform map according to merging results corresponding to different landform categories; and a mapping unit configured to map, by using a preset landform type, the vector graphs corresponding to different landform categories in the first landform map, and take a mapping result as a second landform map.

According to a third aspect of the present disclosure, an electronic device is provided, including: at least one processor; and a memory in communication connection with the at least one processor; wherein the memory stores instructions executable by the at least one processor, and the instructions are executed by the at least one processor to enable the at least one processor to perform the method as described above.

According to a fourth aspect of the present disclosure, a non-transitory computer-readable storage medium storing computer instructions is provided, wherein the computer instructions are configured to cause a computer to perform the method as described above.

According to a fifth aspect of the present disclosure, a computer program product is provided, including a computer program, wherein, when the computer program is executed by a processor, the method as described above is performed.

As can be seen from the above technical solutions, in this embodiment, firstly, a to-be-processed image is converted into vector data, and then, the vector data is converted into a landform map, which realizes automation of landform map building and improves the accuracy and real-time performance of the built landform map.

It should be understood that the content described in this part is neither intended to identify key or significant features of the embodiments of the present disclosure, nor intended to limit the scope of the present disclosure. Other features of the present disclosure will be made easier to understand through the following description.

BRIEF DESCRIPTION OF DRAWINGS

The accompanying drawings are intended to provide a better understanding of the solutions and do not constitute a limitation on the present disclosure. In the drawings.

DETAILED DESCRIPTION OF PREFERRED EMBODIMENTS

Exemplary embodiments of the present disclosure are illustrated below with reference to the accompanying drawings, which include various details of the present disclosure to facilitate understanding and should be considered only as exemplary. Therefore, those of ordinary skill in the art should be aware that various changes and modifications can be made to the embodiments described herein without departing from the scope and spirit of the present disclosure. Similarly, for clarity and simplicity, descriptions of well-known functions and structures are omitted in the following description.

Figure 1:
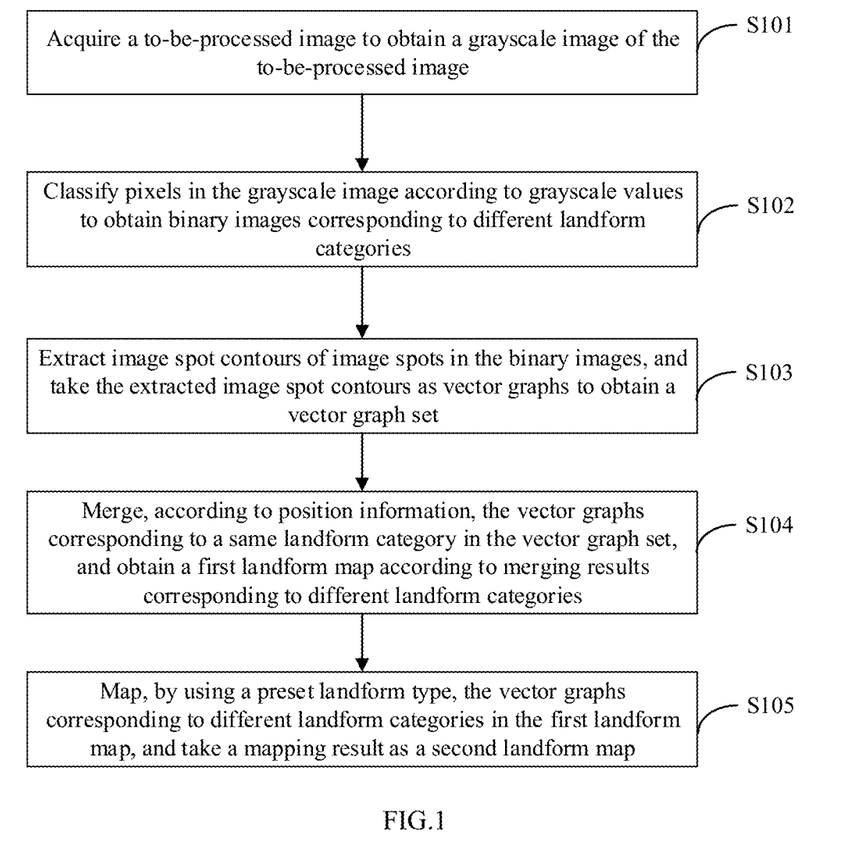
FIG. 1 is a schematic diagram according to a first embodiment of the present disclosure.

FIG. 1 is a schematic diagram according to a first embodiment of the present disclosure. As shown in FIG. 1, a method for building landform map according to this embodiment may specifically include the following steps.

In S101, a to-be-processed image is acquired to obtain a grayscale image of the to-be-processed image.

In S102, pixels in the grayscale image are classified according to grayscale values to obtain binary images corresponding to different landform categories.

In S103, image spot contours of image spots in the binary images are extracted, and the extracted image spot contours are taken as vector graphs to obtain a vector graph set.

In S104, the vector graphs corresponding to a same landform category in the vector graph set are merged according to position information, and a first landform map is obtained according to merging results corresponding to different landform categories.

In S105, the vector graphs corresponding to different landform categories in the first landform map are mapped by using a preset landform type, and a mapping result is taken as a second landform map.

According to the method for building landform map in this embodiment, after binary images corresponding to different landform categories are obtained according to a to-be-processed image, image spot contours of image spots in the binary images are extracted to obtain a vector graph set, and conversion from raster data to vector data is completed; then, vector graphs in the vector graph set are merged to obtain a first landform map; finally, the vector graphs in the first landform map are mapped by using a preset landform type, an obtained second landform map is taken as a building result for a landform map of the to-be-processed image, and conversion from the vector data to the landform map is completed, which can realize automation of landform map building and improves the accuracy and real-time performance of the built landform map.

In this embodiment, when S101 is performed to acquire a to-be-processed image, a remote sensing image may be acquired as the to-be-processed image, and a data type of the acquired to-be-processed image is raster data. In addition, in this embodiment, a number of the to-be-processed image acquired by performing S101 may be one or more.

In this embodiment, when S101 is performed to obtain a grayscale image of the to-be-processed image, the to-be-processed image may be downsampled and remapped, so as to convert a color to-be-processed image into a grayscale image. In the obtained grayscale image, pixels have different grayscale values.

In this embodiment, after S101 is performed to obtain a grayscale image of the to-be-processed image, S102 is performed to classify pixels in the obtained grayscale image according to grayscale values to obtain binary images corresponding to different landform categories.

In this embodiment, a correspondence between grayscale values and landform categories may be preset, and a landform category corresponding to a pixel may be determined according to a grayscale value of the pixel.

Therefore, in this embodiment, when S102 is performed to classify pixels in the obtained grayscale image according to grayscale values to obtain binary images corresponding to different landform categories, an optional implementation used may involve: determining grayscale values of the pixels in the grayscale image; setting, for each grayscale value, a grayscale value of the pixel with the grayscale value in the grayscale image to 1, and setting grayscale values of the other pixels to 0, to obtain a binary image corresponding to the grayscale value; and taking a landform category corresponding to the grayscale value as a landform category of the binary image.

That is, in this embodiment, after the pixels in the grayscale image are classified according to the grayscale values, a plurality of binary images corresponding to different landform categories may be obtained based on classification results, so that different landforms can be distinguished, thereby achieving a purpose of processing data belonging to different landform categories separately.

In this embodiment, after S102 is performed to obtain binary images corresponding to different landform categories, the following content may be further included: determining a binary image corresponding to a preset landform category; and processing the determined binary image by using a processing manner corresponding to the preset landform category.

For example, if the preset landform category in this embodiment is "water body" and a processing manner corresponding to the "water body" is inflation and expansion, in this embodiment, a binary image of the landform category "water body" is determined first, and then the determined binary image is inflated and expanded.

That is, in this embodiment, specific processing on a specific landform can be realized by presetting a landform category, so as to highlight a landform in the preset landform category in a built landform map.

In this embodiment, after S102 is performed to obtain binary images corresponding to different landform categories, S103 is performed to extract image spot contours of image spots in the binary images, and take the extracted image spot contours as vector graphs to obtain a vector graph set. The image spots in this embodiment are regions formed by the pixels with the grayscale value of 1 in the binary images.

In this embodiment, before S103 is performed to extract image spot contours of image spots in the binary images, preprocessing such as opening operation and median filtering may also be performed on the binary images. Through the opening operation on the binary images, fragmentary image spots in the binary images can be connected into pieces. Through the median filtering on the binary images, scattered pixels in the binary images may be removed, and edges of the image spots may be smoothed.

In addition, after S103 is performed to extract image spot contours, the following content may be further included: calculating first coordinates of the contours, for example, wgs84 coordinates of the contours, according to coordinates of pixels in the image spot contours; and converting the calculated first coordinates into second coordinates, for example, converting the wgs84 coordinates into Baidu 09 coordinates, so as to realize coordinate conversion and coordinate encryption of the contours.

In this embodiment, after S103 is performed to obtain a vector graph set, S104 is performed to merge, according to position information, the vector graphs corresponding to a same landform category in the vector graph set, and obtain a first landform map according to merging results corresponding to different landform categories.

That is, in this embodiment, the vector graphs in the obtained vector graph set are restored according to the position information, and the vector graphs are restored to actual positions thereof. The obtained first landform map includes vector graphs corresponding to different landform categories.

In this embodiment, after S103 is performed to obtain a first landform map according to merging results corresponding to different landform categories, the following content may be further included: changing a landform category of the vector graph with an area less than a first preset threshold in the first landform map to a landform category of the vector graph with an area greater than a second preset threshold adjacent thereto.

That is, in this embodiment, the landform category of the vector graph in the first landform map can be changed, so that the landform category of the vector graph with a smaller area is the same as the landform category of the vector graph with a larger area adjacent thereto, thereby further improving the accuracy and consistency of the built first landform map.

In this embodiment, after S104 is performed to obtain a first landform map, S105 is performed to map, by using a preset landform type, the vector graphs corresponding to different landform categories in the first landform map, and take a mapping result as a second landform map.

In this embodiment, the preset landform type used corresponds to a different landform category. That is, different landform categories may have different landform types. The preset landform type may include a landform color, a landform shape and so on.

In this embodiment, after S105 is performed to take a mapping result as a second landform map, the following content may be further included: for two vector graphs intersecting in the second landform map, displaying the vector graph with a smaller area above the vector graph with a larger area.

That is, in this embodiment, for intersection of vector graphs, the vector graph with a smaller area is displayed above the vector graph with a larger area, so as to ensure that the vector graph with a smaller area may not be blocked, thereby ensuring the integrity of the second landform map.

In this embodiment, in the second landform map obtained by performing S105, the vector graphs in different landform categories correspond to different landform types, so that different landform categories can be displayed in the second landform map. By use of the method according to this embodiment, a landform map is automatically built, and the accuracy and real-time performance of the built landform map can be improved.

Figure 2:
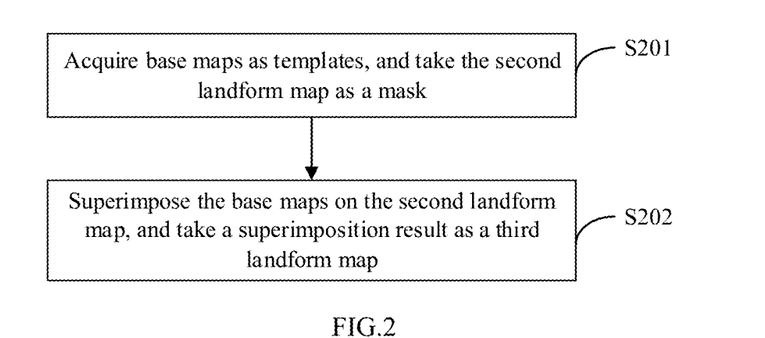
FIG. 2 is a schematic diagram according to a second embodiment of the present disclosure.

FIG. 2 is a schematic diagram according to a second embodiment of the present disclosure. As shown in FIG. 2, after S105 is performed to obtain a second landform map, the method for building landform map according to this embodiment may further include the following steps.

In S201, base maps are acquired as templates, and the second landform map is taken as a mask.

In S202, the base maps are superimposed on the second landform map, and a superimposition result is taken as a third landform map.

Since only landforms in different categories are displayed in the second landform map obtained in this embodiment and roads and other information are lacking, known base maps are acquired and superimposed on the second landform map, and landform information included in the second landform map is superimposed on the base maps, so that the obtained third landform map includes map information such as landform information and road information, so as to realize the fine building of the landform map.

In this embodiment, when S201 is performed to acquire base maps, the base maps may be acquired from a known map database, and then the acquired base maps are taken as templates for superimposition.

In this embodiment, when S202 is performed to superimpose the base maps on the second landform map, and take a superimposition result as a third landform map, an optional implementation used may involve: setting different scales; superimposing the base maps corresponding to a same scale on the second landform map respectively; and taking superimposition results corresponding to different scales as the third landform map, so that the third landform map can display landform information at different scales.

In this embodiment, when S202 is performed to superimpose the base maps corresponding to a same scale on the second landform map respectively, an optional implementation used may involve: determining a superimposition manner corresponding to a current scale; and obtaining vector graphs in the superimposition result by using the determined superimposition manner, and setting landform categories of the vector graphs in the superimposition result.

In this embodiment, superimposition manners corresponding to different scales may be preset. For example, when a scale is 1:500 km, a superimposition manner corresponding to the scale may be to calculate an intersection and a difference set between the base maps and the second landform map. For example, when a scale is 1:1000 km and above, a superimposition manner corresponding to the scale may be to calculate an intersection between the base maps and the second landform map.

In addition, in this embodiment, when S202 is performed to set landform categories of the vector graphs in the superimposition result, the landform categories of the vector graphs in the superimposition result may be set by using a processing manner corresponding to the superimposition manner.

For example, in this embodiment, the landform categories of the vector graphs intersected may be set to landform categories of the vector graphs in the second landform map. In this embodiment, the landform categories of the vector graphs for which the difference set is calculated may be set to the landform categories of the vector graphs with larger areas adjacent thereto in the superimposition result. In this embodiment, the landform category of the vector graph without intersection may be set to the landform category of the vector graph closest thereto.

Figure 3A:
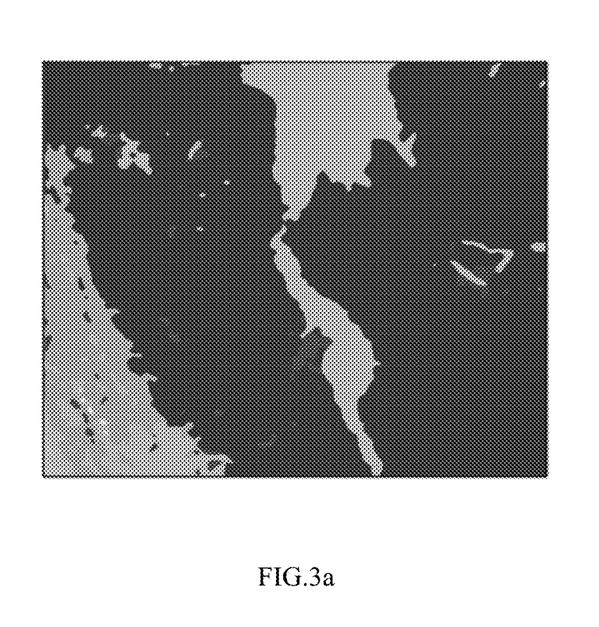
FIG. 3a is a schematic diagram according to a third embodiment of the present disclosure.
Figure 3B:
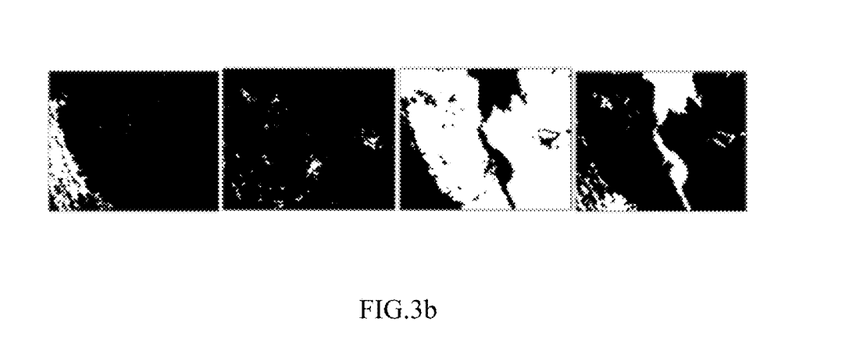
FIG. 3b is a schematic diagram according to a fourth embodiment of the present disclosure.

FIG. 3a is a schematic diagram according to a third embodiment of the present disclosure. The image in FIG. 3a is a grayscale image of a to-be-processed image. FIG. 3b is a schematic diagram according to a fourth embodiment of the present disclosure. The images in FIG. 3b are binary images corresponding to different landform categories. A white region in each binary image is an image spot.

Figure 4:
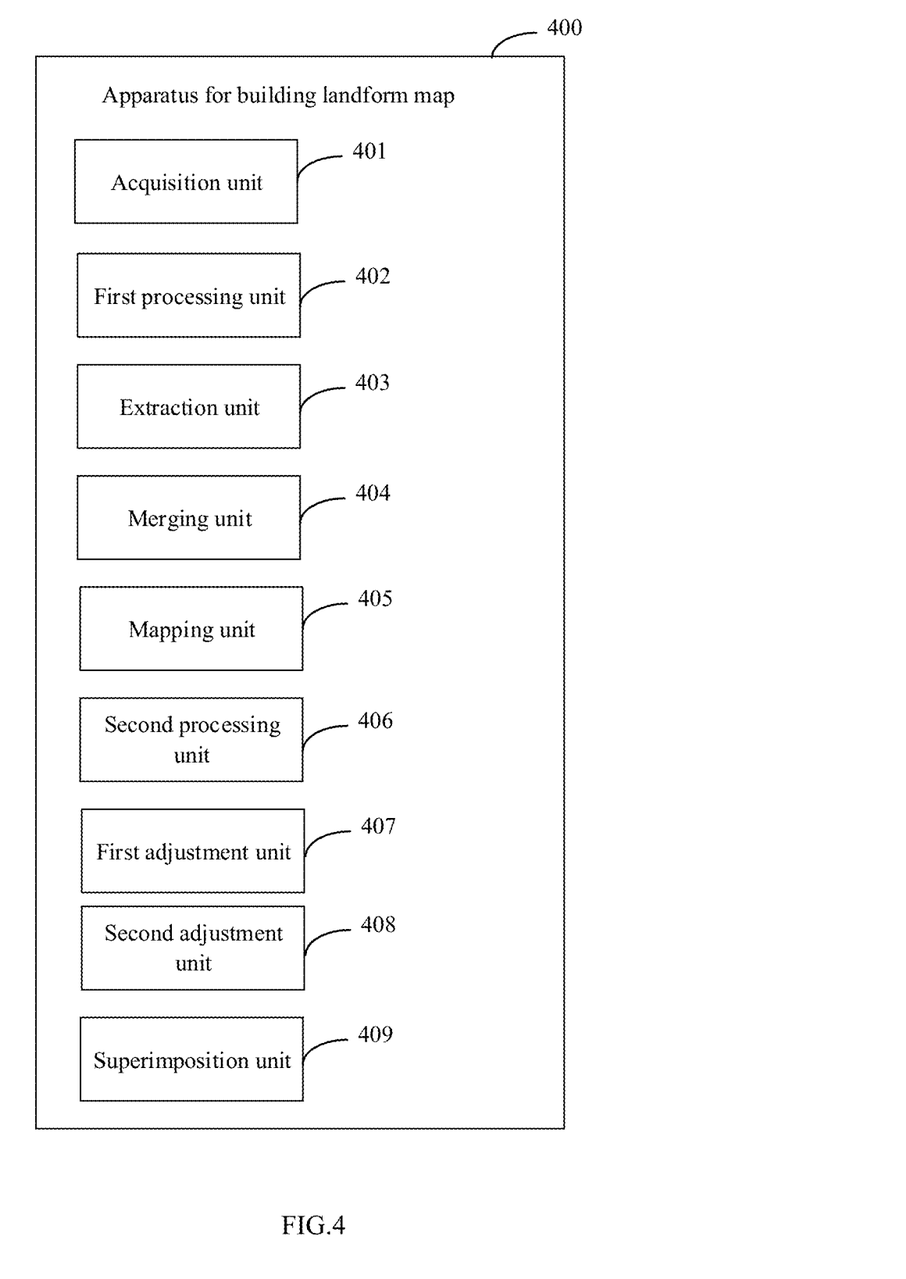
FIG. 4 is a schematic diagram according to a fifth embodiment of the present disclosure.

FIG. 4 is a schematic diagram according to a fifth embodiment of the present disclosure. As shown in FIG. 4, an apparatus 400 for building landform map according to this embodiment includes:

an acquisition unit 401 configured to acquire a to-be-processed image to obtain a grayscale image of the to-be-processed image;

a first processing unit 402 configured to classify pixels in the grayscale image according to grayscale values to obtain binary images corresponding to different landform categories;

an extraction unit 403 configured to extract image spot contours of image spots in the binary images, and take the extracted image spot contours as vector graphs to obtain a vector graph set;

a merging unit 404 configured to merge, according to position information, the vector graphs corresponding to a same landform category in the vector graph set, and obtain a first landform map according to merging results corresponding to different landform categories; and a mapping unit 405 configured to map, by using a preset landform type, the vector graphs corresponding to different landform categories in the first landform map, and take a mapping result as a second landform map.

When acquiring a to-be-processed image, the acquisition unit 401 may acquire a remote sensing image as the to-be-processed image, and a data type of the acquired to-be-processed image is raster data. In addition, in this embodiment, a number of the to-be-processed image acquired by the acquisition unit 401 may be one or more.

When obtaining a grayscale image of the to-be-processed image, the acquisition unit 401 may downsample and remap the to-be-processed image, so as to convert a color to-be-processed image into a grayscale image. In the obtained grayscale image, pixels have different grayscale values.

In this embodiment, after the acquisition unit 401 obtains a grayscale image of the to-be-processed image, the first processing unit 402 classifies pixels in the obtained grayscale image according to grayscale values to obtain binary images corresponding to different landform categories.

In this embodiment, a correspondence between grayscale values and landform categories may be preset, and a landform category corresponding to a pixel may be determined according to a grayscale value of the pixel.

Therefore, when the first processing unit 402 classifies pixels in the obtained grayscale image according to grayscale values to obtain binary images corresponding to different landform categories, an optional implementation used may involve: determining grayscale values of the pixels in the grayscale image; setting, for each grayscale value, a grayscale value of the pixel with the grayscale value in the grayscale image to 1, and setting grayscale values of the other pixels to 0, to obtain a binary image corresponding to the grayscale value; and taking a landform category corresponding to the grayscale value as a landform category of the binary image.

That is, in this embodiment, after classifying the pixels in the grayscale image according to the grayscale values, the first processing unit 402 may obtain a plurality of binary images corresponding to different landform categories based on classification results, so that different landforms can be distinguished, thereby achieving a purpose of processing data belonging to different landform categories separately.

In this embodiment, the apparatus 400 for building landform map according to this embodiment further includes a second processing unit 406 configured to perform, after the first processing unit 402 obtains binary images corresponding to different landform categories, the following content: determining a binary image corresponding to a preset landform category; and processing the determined binary image by using a processing manner corresponding to the preset landform category.

That is, the second processing unit 406 can realize specific processing on a specific landform by presetting a landform category, so as to highlight a landform in the preset landform category in a built landform map.

In this embodiment, after the first processing unit 402 obtains binary images corresponding to different landform categories, the extraction unit 403 extracts image spot contours of image spots in the binary images, and takes the extracted image spot contours as vector graphs to obtain a vector graph set. The image spots in this embodiment are regions formed by the pixels with the grayscale value of 1 in the binary images.

Before extracting image spot contours of image spots in the binary images, the extraction unit 403 may further perform preprocessing such as opening operation and median filtering on the binary images. Through the opening operation on the binary images, fragmentary image spots in the binary images can be connected into pieces. Through the median filtering on the binary images, scattered pixels in the binary images may be removed, and edges of the image spots may be smoothed.

In addition, after the extraction unit 403 extracts image spot contours, the following content may be further included: calculating first coordinates of the contours, for example, wgs84 coordinates of the contours, according to coordinates of pixels in the image spot contours; and converting the calculated first coordinates into second coordinates, for example, converting the wgs84 coordinates into Baidu 09 coordinates, so as to realize coordinate conversion and coordinate encryption of the contours.

In this embodiment, after the extraction unit 403 obtains a vector graph set, the merging unit 404 merges, according to position information, the vector graphs corresponding to a same landform category in the vector graph set, and obtains a first landform map according to merging results corresponding to different landform categories.

That is, the merging unit 404 restores the vector graphs in the obtained vector graph set according to the position information to restore the vector graphs to actual positions thereof. The obtained first landform map includes vector graphs corresponding to different landform categories.

The apparatus 400 for building landform map according to this embodiment further includes a first adjustment unit 407 configured to perform, after the merging unit 404 obtains a first landform map according to merging results corresponding to different landform categories, the following content: changing a landform category of the vector graph with an area less than a first preset threshold in the first landform map to a landform category of the vector graph with an area greater than a second preset threshold adjacent thereto.

That is, the first adjustment unit 407 can change the landform category of the vector graph with a smaller area in the first landform map, so that the landform category of the vector graph with a smaller area is the same as the landform category of the vector graph with a larger area adjacent thereto, thereby further improving the accuracy and consistency of the built first landform map.

In this embodiment, after the merging unit 404 obtains a first landform map, the mapping unit 405 maps, by using a preset landform type, the vector graphs corresponding to different landform categories in the first landform map, and take a mapping result as a second landform map.

The preset landform type used in the mapping unit 405 corresponds to a different landform category. That is, different landform categories may have different landform types. The preset landform type may include a landform color, a landform shape and so on.

The apparatus 400 for building landform map according to this embodiment further includes a second adjustment unit 408 configured to perform, after the mapping unit 405 takes a mapping result as a second landform map, the following content: for two vector graphs intersecting in the second landform map, displaying the vector graph with a smaller area above the vector graph with a larger area.

That is, the second adjustment unit 408, displays, for intersection of vector graphs, the vector graph with a smaller area above the vector graph with a larger area, so as to ensure that the vector graph with a smaller area may not be blocked, thereby ensuring the integrity of the second landform map.

The apparatus 400 for building landform map according to this embodiment further includes a superimposition unit 409 configured to perform, after the mapping unit 405 takes a mapping result as a second landform map, the following content: acquiring base maps as templates, and taking the second landform map as a mask; and superimposing the base maps on the second landform map, and taking a superimposition result as a third landform map.

When acquiring the base maps, the superimposition unit 409 may acquire the base maps from a known map database, and then take the acquired base maps as templates for superimposition.

In this embodiment, when the superimposition unit 409 superimposes the base maps on the second landform map, and takes a superimposition result as a third landform map, an optional implementation used may involve: setting different scales; superimposing the base maps corresponding to a same scale on the second landform map respectively; and taking superimposition results corresponding to different scales as the third landform map, so that the third landform map can display landform information at different scales.

When the superimposition unit 409 superimposes the base maps corresponding to a same scale on the second landform map respectively, an optional implementation used may involve: determining a superimposition manner corresponding to a current scale; and obtaining vector graphs in the superimposition result by using the determined superimposition manner, and setting landform categories of the vector graphs in the superimposition result.

In addition, when setting landform categories of the vector graphs in the superimposition result, the superimposition unit 409 may set the landform categories of the vector graphs in the superimposition result by using a processing manner corresponding to the superimposition manner.

Acquisition, storage and application of users' personal information involved in the technical solutions of the present disclosure comply with relevant laws and regulations, and do not violate public order and moral.

According to embodiments of the present disclosure, the present disclosure further provides an electronic device, a readable storage medium and a computer program product.

Figure 5:
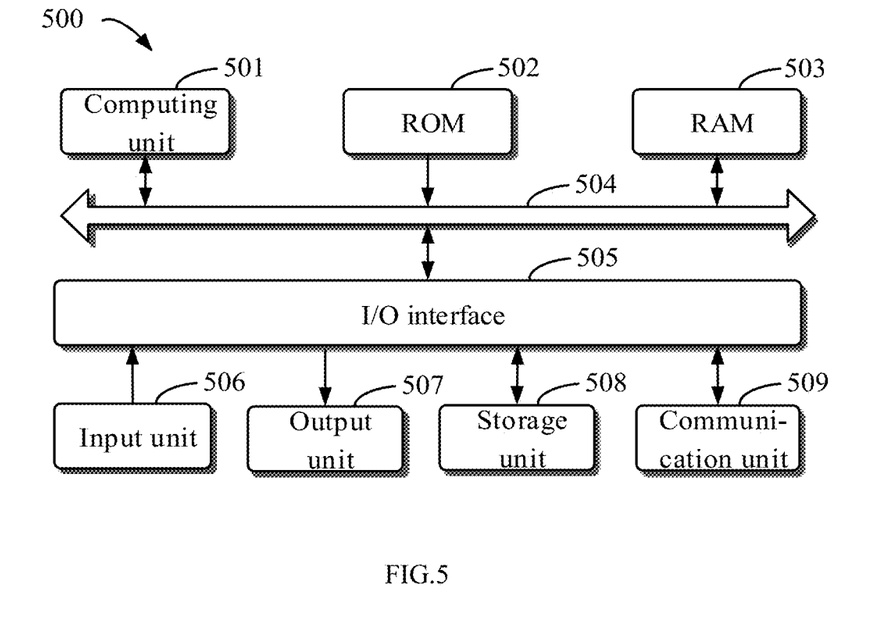
FIG. 5 is a block diagram of an electronic device configured to implement a method for building landform map according to an embodiment of the present disclosure.

FIG. 5 is a block diagram of an electronic device configured to implement a method for building landform map according to an embodiment of the present disclosure. The electronic device is intended to represent various forms of digital computers, such as laptops, desktops, workbenches, personal digital assistants, servers, blade servers, mainframe computers and other suitable computing devices. The electronic device may further represent various forms of mobile devices, such as personal digital assistants, cellular phones, smart phones, wearable devices and other similar computing devices. The components, their connections and relationships, and their functions shown herein are examples only, and are not intended to limit the implementation of the present disclosure as described and/or required herein.

As shown in FIG. 5, the device 500 includes a computing unit 501, which may perform various suitable actions and processing according to a computer program stored in a read-only memory (ROM) 502 or a computer program loaded from a storage unit 508 into a random access memory (RAM) 503. The RAM 503 may also store various programs and data required to operate the device 500. The computing unit 501, the ROM 502 and the RAM 503 are connected to one another by a bus 504. An input/output (I/O) interface 505 may also be connected to the bus 504.

A plurality of components in the device 500 are connected to the I/O interface 505, including an input unit 506, such as a keyboard and a mouse; an output unit 507, such as various displays and speakers; a storage unit 508, such as disks and discs; and a communication unit 509, such as a network card, a modem and a wireless communication transceiver. The communication unit 509 allows the device 500 to exchange information/data with other devices over computer networks such as the Internet and/or various telecommunications networks.

The computing unit 501 may be a variety of general-purpose and/or special-purpose processing components with processing and computing capabilities. Some examples of the computing unit 501 include, but are not limited to, a central processing unit (CPU), a graphics processing unit (GPU), various artificial intelligence (AI) computing chips, various computing units that run machine learning model algorithms, a digital signal processor (DSP), and any appropriate processor, controller or microcontroller, etc. The computing unit 501 performs the methods and processing described above, such as the method for building landform map. For example, in some embodiments, the method for building landform map may be implemented as a computer software program that is tangibly embodied in a machine-readable medium, such as the storage unit 508.

In some embodiments, part or all of a computer program may be loaded and/or installed on the device 500 via the ROM 502 and/or the communication unit 509. One or more steps of the method for building landform map described above may be performed when the computer program is loaded into the RAM 503 and executed by the computing unit 501. Alternatively, in other embodiments, the computing unit 501 may be configured to perform the method for building landform map by any other appropriate means (for example, by means of firmware).

Various implementations of the systems and technologies disclosed herein can be realized in a digital electronic circuit system, an integrated circuit system, a field programmable gate array (FPGA), an application-specific integrated circuit (ASIC), an application-specific standard product (ASSP), a system on chip (SOC), a complex programmable logic device (CPLD), computer hardware, firmware, software, and/or combinations thereof. Such implementations may include implementation in one or more computer programs that are executable and/or interpretable on a programmable system including at least one programmable processor, which can be special or general purpose, configured to receive data and instructions from a storage system, at least one input apparatus, and at least one output apparatus, and to transmit data and instructions to the storage system, the at least one input apparatus, and the at least one output apparatus.

Program codes configured to implement the method in the present disclosure may be written in any combination of one or more programming languages. Such program codes may be supplied to a processor or controller of a general-purpose computer, a special-purpose computer, or another programmable data processing apparatus to enable the function/operation specified in the flowchart and/or block diagram to be implemented when the program codes are executed by the processor or controller. The program codes may be executed entirely on a machine, partially on a machine, partially on a machine and partially on a remote machine as a stand-alone package, or entirely on a remote machine or a server.

In the context of the present disclosure, machine-readable media may be tangible media which may include or store programs for use by or in conjunction with an instruction execution system, apparatus or device. The machine-readable media may be machine-readable signal media or machine-readable storage media. The machine-readable media may include, but are not limited to, electronic, magnetic, optical, electromagnetic, infrared, or semiconductor systems, apparatuses or devices, or any suitable combinations thereof. More specific examples of machine-readable storage media may include electrical connections based on one or more wires, a portable computer disk, a hard disk, an RAM, an ROM, an erasable programmable read only memory (EPROM or flash memory), an optical fiber, a compact disk read only memory (CD-ROM), an optical storage device, a magnetic storage device, or any suitable combination thereof.

To provide interaction with a user, the systems and technologies described here can be implemented on a computer. The computer has: a display apparatus (e.g., a cathode-ray tube (CRT) or a liquid crystal display (LCD) monitor) for displaying information to the user; and a keyboard and a pointing apparatus (e.g., a mouse or trackball) through which the user may provide input for the computer. Other kinds of apparatuses may also be configured to provide interaction with the user. For example, a feedback provided for the user may be any form of sensory feedback (e.g., visual, auditory, or tactile feedback); and input from the user may be received in any form (including sound input, voice input, or tactile input).

The systems and technologies described herein can be implemented in a computing system including background components (e.g., as a data server), or a computing system including middleware components (e.g., an application server), or a computing system including front-end components (e.g., a user computer with a graphical user interface or web browser through which the user can interact with the implementation schema of the systems and technologies described here), or a computing system including any combination of such background components, middleware components or front-end components. The components of the system can be connected to each other through any form or medium of digital data communication (e.g., a communication network). Examples of the communication network include: a local area network (LAN), a wide area network (WAN) and the Internet.

The computer system may include a client and a server. The client and the server are generally far away from each other and generally interact via the communication network. A relationship between the client and the server is generated through computer programs that run on a corresponding computer and have a client-server relationship with each other. The server may be a cloud server, also known as a cloud computing server or cloud host, which is a host product in the cloud computing service system to solve the problems of difficult management and weak business scalability in the traditional physical host and a virtual private server (VPS). The server may also be a distributed system server, or a server combined with blockchain.

It should be understood that the steps can be reordered, added, or deleted using the various forms of processes shown above. For example, the steps described in the present disclosure may be executed in parallel or sequentially or in different sequences, provided that desired results of the technical solutions disclosed in the present disclosure are achieved, which is not limited herein.

The above specific implementations do not limit the protection scope of the present disclosure. Those skilled in the art should understand that various modifications, combinations, sub-combinations, and replacements can be made according to design requirements and other factors. Any modifications, equivalent substitutions and improvements made within the spirit and principle of the present disclosure all should be included in the protection scope of the present disclosure.

What is claimed is:

1. A method for building landform map, comprising:
acquiring a to-be-processed image to obtain a grayscale image of the to-be-processed image;
classifying pixels in the grayscale image according to grayscale values to obtain binary images corresponding to different landform categories;
extracting image spot contours of image spots in the binary images, and taking the extracted image spot contours as vector graphs to obtain a vector graph set;
merging, according to position information, the vector graphs corresponding to a same landform category in the vector graph set, and obtaining a first landform map according to merging results corresponding to different landform categories; and
mapping, by using a preset landform type, the vector graphs corresponding to different landform categories in the first landform map, and taking a mapping result as a second landform map.

2. The method according to claim 1, wherein the step of classifying pixels in the grayscale image according to grayscale values to obtain binary images corresponding to different landform categories comprises:
determining grayscale values of the pixels in the grayscale image;
setting, for each grayscale value, a grayscale value of the pixel with the grayscale value in the grayscale image to 1, and setting grayscale values of the other pixels to 0, to obtain a binary image corresponding to the grayscale value; and
taking a landform category corresponding to the grayscale value as a landform category of the binary image.

3. The method according to claim 1, further comprising:
after the step of obtaining binary images corresponding to different landform categories, determining a binary image corresponding to a preset landform category; and
processing the determined binary image by using a processing manner corresponding to the preset landform category.

4. The method according to claim 1, further comprising:
after the step of obtaining a first landform map according to merging results corresponding to different landform categories, changing a landform category of the vector graph with an area less than a first preset threshold in the first landform map to a landform category of the vector graph with an area greater than a second preset threshold adjacent thereto.

5. The method according to claim 1, further comprising:
after the step of taking a mapping result as a second landform map, for two vector graphs intersecting in the second landform map, displaying the vector graph with a smaller area above the vector graph with a larger area.

6. The method according to claim 1, further comprising:
after the step of taking a mapping result as a second landform map, acquiring base maps as templates, and taking the second landform map as a mask; and
superimposing the base maps on the second landform map, and taking a superimposition result as a third landform map.

7. The method according to claim 6, wherein the step of superimposing the base maps on the second landform map, and taking a superimposition result as a third landform map comprises:
setting different scales;
superimposing the base maps corresponding to a same scale on the second landform map respectively; and
taking superimposition results corresponding to different scales as the third landform map.

8. The method according to claim 7, wherein the step of superimposing the base maps corresponding to a same scale on the second landform map respectively comprises:
determining a superimposition manner corresponding to a current scale; and
obtaining vector graphs in the superimposition result by using the determined superimposition manner, and setting landform categories of the vector graphs in the superimposition result.

9. An electronic device, comprising:
at least one processor; and
a memory communicatively connected with the at least one processor;
wherein the memory stores instructions executable by the at least one processor, and the instructions are executed by the at least one processor to enable the at least one processor to perform a method for building landform map, wherein the method comprises:
acquiring a to-be-processed image to obtain a grayscale image of the to-be-processed image;
classifying pixels in the grayscale image according to grayscale values to obtain binary images corresponding to different landform categories;
extracting image spot contours of image spots in the binary images, and taking the extracted image spot contours as vector graphs to obtain a vector graph set;
merging, according to position information, the vector graphs corresponding to a same landform category in the vector graph set, and obtaining a first landform map according to merging results corresponding to different landform categories; and
mapping, by using a preset landform type, the vector graphs corresponding to different landform categories in the first landform map, and taking a mapping result as a second landform map.

10. The electronic device according to claim 9, wherein, the step of classifying pixels in the grayscale image according to grayscale values to obtain binary images corresponding to different landform categories comprises:
determining grayscale values of the pixels in the grayscale image;
setting, for each grayscale value, a grayscale value of the pixel with the grayscale value in the grayscale image to 1, and setting grayscale values of the other pixels to 0, to obtain a binary image corresponding to the grayscale value; and
taking a landform category corresponding to the grayscale value as a landform category of the binary image.

11. The electronic device according to claim 9, further comprising:
after the step of obtaining binary images corresponding to different landform categories, determining a binary image corresponding to a preset landform category; and
processing the determined binary image by using a processing manner corresponding to the preset landform category.

12. The electronic device according to claim 9, further comprising:
after the step of obtaining a first landform map according to merging results corresponding to different landform categories, changing a landform category of the vector graph with an area less than a first preset threshold in the first landform map to a landform category of the vector graph with an area greater than a second preset threshold adjacent thereto.

13. The electronic device according to claim 9, further comprising:
after the step of taking a mapping result as a second landform map, for two vector graphs intersecting in the second landform map, displaying the vector graph with a smaller area above the vector graph with a larger area.

14. The electronic device according to claim 9, further comprising:
after the step of taking a mapping result as a second landform map, acquiring base maps as templates, and take the second landform map as a mask; and
superimposing the base maps on the second landform map, and taking a superimposition result as a third landform map.

15. The electronic device according to claim 14, wherein the step of superimposing the base maps on the second landform map, and taking a superimposition result as a third landform map comprises:
setting different scales;
superimposing the base maps corresponding to a same scale on the second landform map respectively; and
taking superimposition results corresponding to different scales as the third landform map.

16. The electronic device according to claim 15, wherein the step of superimposing the base maps corresponding to a same scale on the second landform map respectively comprises:
determining a superimposition manner corresponding to a current scale; and
obtaining vector graphs in the superimposition result by using the determined superimposition manner, and setting landform categories of the vector graphs in the superimposition result.

17. A non-transitory computer-readable storage medium storing computer instructions therein, wherein the computer instructions are used to cause the computer to perform a method for building landform map, wherein the method comprises:
acquiring a to-be-processed image to obtain a grayscale image of the to-be-processed image;
classifying pixels in the grayscale image according to grayscale values to obtain binary images corresponding to different landform categories;
extracting image spot contours of image spots in the binary images, and taking the extracted image spot contours as vector graphs to obtain a vector graph set;
merging, according to position information, the vector graphs corresponding to a same landform category in the vector graph set, and obtaining a first landform map according to merging results corresponding to different landform categories; and
mapping, by using a preset landform type, the vector graphs corresponding to different landform categories in the first landform map, and taking a mapping result as a second landform map.

18. The non-transitory computer-readable storage medium according to claim 17, wherein the step of classifying pixels in the grayscale image according to grayscale values to obtain binary images corresponding to different landform categories comprises:

determining grayscale values of the pixels in the grayscale image;

setting, for each grayscale value, a grayscale value of the pixel with the grayscale value in the grayscale image to 1, and setting grayscale values of the other pixels to 0, to obtain a binary image corresponding to the grayscale value; and taking a landform category corresponding to the grayscale value as a landform category of the binary image.

19. The non-transitory computer-readable storage medium according to claim 17, further comprising:

after the step of obtaining binary images corresponding to different landform categories, determining a binary image corresponding to a preset landform category; and processing the determined binary image by using a processing manner corresponding to the preset landform category.

20. The non-transitory computer-readable storage medium according to claim 17, further comprising:

after the step of obtaining a first landform map according to merging results corresponding to different landform categories, changing a landform category of the vector graph with an area less than a first preset threshold in the first landform map to a landform category of the vector graph with an area greater than a second preset threshold adjacent thereto.

* * * * *